(12) United States Patent
Baskey et al.

(10) Patent No.: US 6,732,269 B1
(45) Date of Patent: May 4, 2004

(54) METHODS, SYSTEMS AND COMPUTER PROGRAM PRODUCTS FOR ENHANCED SECURITY IDENTITY UTILIZING AN SSL PROXY

(75) Inventors: Michael Edward Baskey, Wappingers Falls, NY (US); Timothy James Hahn, Vestal, NY (US); Dilip Dinkar Kandlur, Yorktown Heights, NY (US); David Gerard Kuehr-McLaren, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/411,471

(22) Filed: Oct. 1, 1999

(51) Int. Cl.[7] .................................................. G06F 1/24
(52) U.S. Cl. ...................... 713/153; 713/161; 713/165; 713/170; 713/189; 713/200
(58) Field of Search ................................ 713/153, 161, 713/165, 166, 168, 170, 189, 200, 201

(56) References Cited

U.S. PATENT DOCUMENTS

| | | | |
|---|---|---|---|
| 5,657,390 A | | 8/1997 | Elgamal et al. ................ 380/49 |
| 5,875,296 A | * | 2/1999 | Shi et al. ..................... 713/202 |
| 5,935,212 A | * | 8/1999 | Kalajan et al. ............. 709/228 |
| 6,104,716 A | | 8/2000 | Crichton et al. ............ 370/401 |

* cited by examiner

Primary Examiner—Thomas R. Peeso
(74) Attorney, Agent, or Firm—Myers Bigel Sibley & Sajovec, P.A.; Jeanine S. Ray-Yarletts

(57) ABSTRACT

Methods, systems and computer program products are provided which communicate between client applications and a transaction server by establishing a persistent secure connection between the transaction server and a Secure Socket Layer (SSL) proxy server. A first session specific SSL connection, different from the persistent secure connection, is also established between a first client application and the SSL proxy server.

Communications between the first client application and the SSL proxy server transmitted over the first session specific SSL connection are then forwarded with the client's identity preserved to the transaction server over the persistent secure connection. Furthermore, a second session specific SSL connection between a second client application and the SSL proxy server may also be established and the communications between the second client application and the SSL proxy server transmitted over the second session specific SSL connection are forwarded to the transaction server over the persistent secure connection. Preferably, the persistent secure connection is an SSL connection.

30 Claims, 7 Drawing Sheets

METHODS, SYSTEMS AND COMPUTER PROGRAM PRODUCTS FOR ENHANCED SECURITY IDENTITY UTILIZING AN SSL PROXY

FIELD OF THE INVENTION

The present invention relates to secure communications between a client and a server, and, in particular, to secure communications utilizing the Secure Socket Layer (SSL).

BACKGROUND OF THE INVENTION

In communications between a client and a server, it is often beneficial to provide increased security. One mechanism for providing increased security is through the use of the Secure Socket Layer (SSL) protocol. FIG. 1 illustrates a conventional SSL connection between a client 10 and a server 12. As seen in FIG. 1, the client 10 communicates directly with the server 12 utilizing the SSL connection 16.

The SSL Protocol may provide privacy and reliability between two communicating applications. The SSL protocol utilizes two layers, the lowest layer of which is the SSL Record Protocol, which is layered on top of a communications protocol such as TCP/IP. The SSL Record Protocol encapsulates higher level protocols such as the SSL Handshake Protocol. The SSL Handshake Protocol allows the server and client to authenticate each other and to establish an encryption method and keys.

One advantage of SSL is that it is application protocol independent. A higher level protocol can layer on top of the SSL Protocol transparently. Thus, the SSL protocol provides connection security where encryption is used after an initial handshake to define a secret key, and where the communication partner's identity can be authenticated using asymmetric, or public key, cryptography such as RSA. Details on SSL communications may be found in U.S. Pat. No. 5,657,390 entitled "SECURE SOCKET LAYER APPLICATION PROGRAM APPARATUS AND METHOD," the disclosure of which is incorporated herein by reference as if set forth fully herein.

One problem associated with the use of SSL between a client and a server is that establishing an SSL connection may impose a substantial burden on a server. For example, if a server has multiple SSL connections to clients, the creation of an additional SSL connection may adversely impact on the performance of transactions to other clients through the utilization of server processing resources to establish the additional connection.

One approach to reducing the performance degradation of a server as a result of the use of SSL connections is through the use of an SSL proxy server as illustrated in FIG. 2. An SSL proxy server may be dedicated to establishing SSL connections and, therefore, may quickly establish an SSL connection as well as provide hardware decryption so as to relieve the burden imposed on the server by the SSL connection. As seen in FIG. 2, a client 10 communicates with the SSL proxy server 14 over an SSL connection 16. The SSL proxy server 14 then communicates with the server 12 over a non-secure connection 18. In such a case, however, the security between the client 10 and the server 12 may be lost between the SSL proxy server 14 and the server 12. Furthermore, the client identity information contained in the SSL communications may also be lost between the SSL proxy server 14 and the server 12.

The system of FIG. 3 illustrates the use of an SSL proxy server 14 where SSL connections 16, 16', 20 and 20' are established between the SSL proxy server 14 and both the clients 10 and 10' and the server 12. As seen in FIG. 3, for each SSL connection 16, 16' between the client 10 and 10' and the SSL proxy server 14, there is a corresponding SSL connection 20, 20' established between the SSL proxy server 14 and the server 12 which acts as a pipe through the SSL proxy server 14 to the server 12. However, the system of FIG. 3, while providing security between the SSL proxy server 14 and the server 12, may still result in performance degradation of server 12 as a result of the use of the SSL connections 20, 20' for each client 10, 10'.

In light of the above discussion, a need exists for improvements in the use of SSL communications between clients and servers.

SUMMARY OF THE INVENTION

In view of the above discussion, it is an object of the present invention to provide for improved performance in communications between clients and servers utilizing the SSL protocol.

A further object of the present invention is to reduce the impact of the use of SSL protocols on the performance of a server while maintaining the security and client identity provided by such protocols.

Still another object of the present invention is to improve the scalability of server applications utilizing SSL communications.

These and other objects of the present invention may be provided by methods, systems, and computer program products which communicate between client applications and a transaction server by establishing a persistent secure connection between the transaction server and a Secure Socket Layer (SSL) proxy server. A first session specific SSL connection, different from the persistent secure connection, is also established between a first client application and the SSL proxy server. Communications between the first client application and the SSL proxy server transmitted over the first session specific SSL connection are then forwarded to the transaction server over the persistent secure connection. Furthermore, a second session specific SSL connection between a second client application and the SSL proxy server may also be established and the communications between the second client application and the SSL proxy server transmitted over the second session specific SSL connection may also be forwarded to the transaction server over the persistent secure connection. Preferably, the persistent secure connection is an SSL connection.

By establishing a persistent secure connection between the SSL proxy server and the transaction server, the overhead and burden of establishing a connection each time a client makes an SSL connection may be reduced. Furthermore by utilizing the persistent secure connection for multiple SSL connections, the performance of the transaction server may be maintained even in the presence of numerous SSL client connections because the transaction server is not burdened with establishing a connection for each SSL connection. Thus, the present invention may be readily scaled to accommodate increased numbers of SSL clients by adding additional SSL proxy servers without a corresponding burden on the transaction server. Furthermore, because the persistent connection is secure, the security of the communications with the client is not lost between the SSL proxy server and the transaction server.

In a further embodiment of the present invention, client identification information extracted from the communications between the client application and the SSL proxy server is provided to the transaction server in a message transmitted to the transaction server over the persistent secure connection. Such a message may be created by incorporating the client identification information as a message header of the message and transmitting the message with the message header to the transaction server over the persistent secure connection. The transaction server may receive the message transmitted over the persistent secure connection and extract from the message the client identification information. Content information may also be extracted from the communications over the SSL connection with the client. The client identification information and the extracted content information may then be provided to a transaction server application associated with the transaction server.

In an alternative embodiment which provides client identification information to the transaction server, a second connection between the SSL proxy server and the transaction server is established. The client identification information and content information are extracted from the communications over the SSL connection with the client application. The client identification information is then transmitted to the transaction server over the second connection and the content information transmitted to the transaction server over the persistent secure connection. The content information transmitted over the persistent secure connection and the client identification information transmitted over the second connection may then be received by the transaction server and provided to a transaction server application associated with the transaction server.

By providing the client identification information to the transaction server, either in a message over the persistent secure connection or over a separate connection, information from the SSL connection with the client is not lost through the use of the SSL proxy server. Thus, the utilization of a persistent secure connection to an SSL proxy server may be transparent to a server application executing on the transaction server.

In a further embodiment of the present invention, a system for communicating with client applications is provided. The system, preferably includes an SSL proxy server operable for establishing Secure Socket Layer (SSL) connections with the client applications and a transaction server. A persistent secure connection between the SSL proxy server and the transaction server over which communications received over the SSL connections with the client applications are multiplexed is also provided. Preferably, the persistent secure connection comprises an SSL connection between the SSL proxy server and the transaction server.

The SSL proxy server may multiplex communications from the client applications onto the persistent secure connection and de-multiplex communications from the persistent secure connection onto the SSL connections with the client applications.

The system may also provide a second connection between the SSL proxy server and the transaction server operable to provide client identification information associated with communications over the persistent secure connection to the transaction server. The second connection may also be a persistent connection. In such a case it is also preferred that the transaction server match client identification information received over the second connection with the associated communications received over the persistent secure connection to provide the client identification and the associated communications received over the persistent secure connection to a server application.

As will further be appreciated by those of skill in the art, the present invention may be embodied as methods, apparatus/systems and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 1:
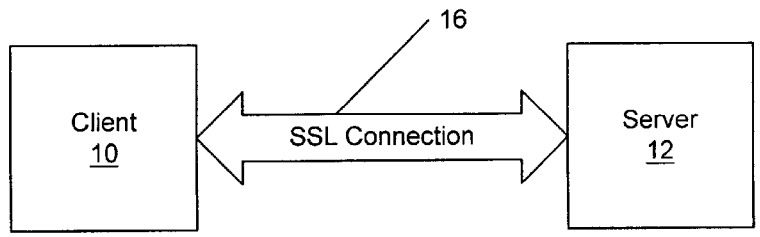
FIG. 1 is diagram of conventional communications between a client and a server utilizing SSL.
Figure 2:
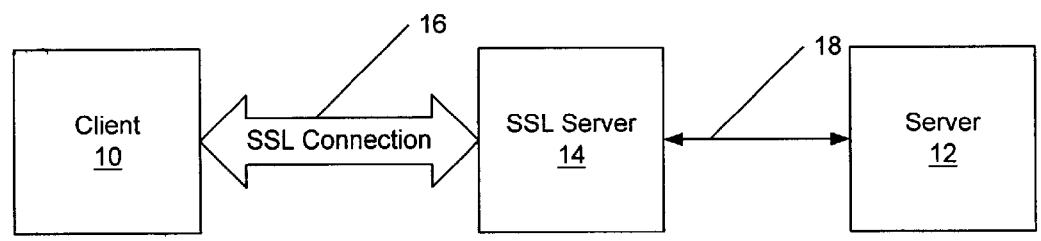
FIG. 2 is a diagram of one mechanism for conventional communications between a client and a server utilizing an SSL proxy server.
Figure 3:
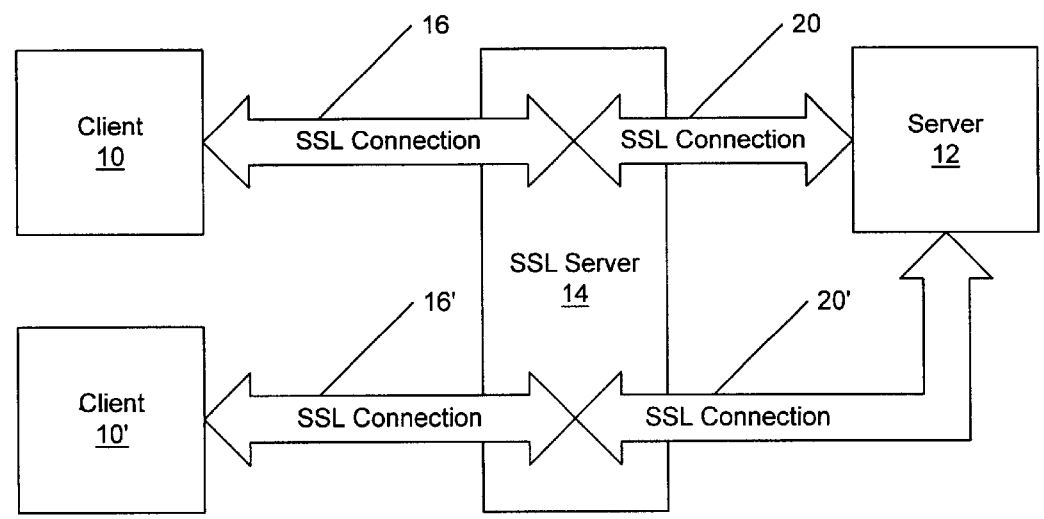
FIG. 3 is a diagram of an alternative mechanism for conventional communications between a client and a server utilizing an SSL proxy server.
Figure 4:
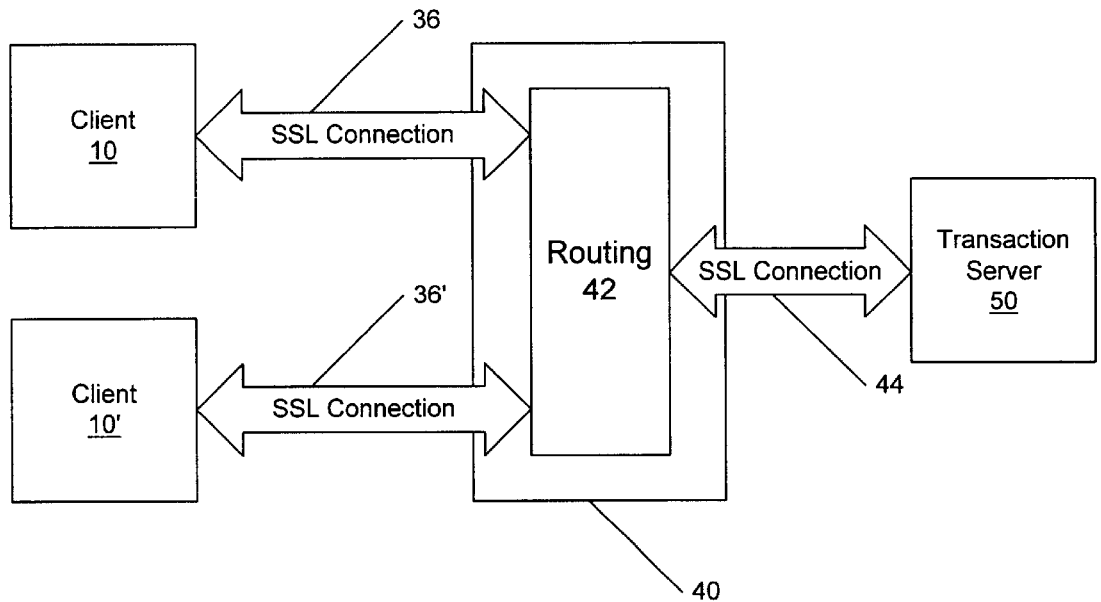
FIG. 4 is a diagram of communications between a client and a server utilizing an SSL proxy server according to the present invention.

The present invention can be embodied as systems, methods, or computer program products for communicating between a client application and a server application utilizing a secure connection such as that provided by the SSL protocol. As seen in FIG. 4, the present invention utilizes a modified SSL proxy server 40 to provide scalable secure communications between a client application 10 or 10' and a transaction server 50. The present invention may utilize many different types of known SSL proxy servers which may be modified as described herein so as to provide the capabilities of the present invention. In particular, an SSL proxy server 40 may include a routing function 42 which routes communications from client specific SSL connections 36 and 36' to client applications 10 and 10' onto a persistent secure connection such as the SSL connection 44 between the transaction server 50 and the SSL proxy server 40. As will be appreciated by those of skill in the art, the routing function 42 may take the form of a module or other programming component stored in a processing system memory or storage device, may be a hardware function or may be a combination of hardware and software.

Furthermore, the SSL proxy server 40 may include dedicated hardware for establishing SSL connections, such as, for example, hardware decryption. Also, the client applications may be executed on a wide range of processing systems from personal computers pervasive computing devices such as smartphones, personal data assistants or the like, network computers or any data processing system capable of communicating over an SSL connection. Similarly, the transaction and SSL proxy servers may be implemented in a wide variety of processing systems from network servers or workstations to mainframe computers. Accordingly, the present invention should not be construed as limited to a particular platform for execution of the client applications or the server applications. Also, while the present invention is described herein with reference to an SSL connection between the SSL proxy server 40 and the transaction server 50, other forms of secure connection may be utilized, such as, for example, a Virtual Private Network (VPN) tunnel, Internet Protocol Security (IPSEC), or Enterprise System Connectivity (ESCON).

In further detail, the routing function 42 of FIG. 4 receives information contained in messages transmitted from the clients 10 and 10' over the client specific SSL connections 36 and 36' and provides this received information over the SSL connection 44 to the transaction server 50. The SSL connection 44 is a persistent secure connection between the SSL proxy server 40 and the transaction server 50. As used herein, a "persistent secure connection" is a secure connection, such as SSL connection 44, which is established and maintained over multiple client specific SSL connections 36, 36' between the SSL proxy server 40 and clients such as clients 10 and 10'.

Information received from clients 10 and 10' over client specific SSL connections 36 and 36', including client identification information provided by the SSL protocol, may be multiplexed over the persistent SSL connection 44 by the routing function 42. Similarly, information from the transaction server 50 is received by the SSL proxy server 40 over the persistent SSL connection 44 and de-multiplexed or routed by the routing function 42 to the appropriate client specific SSL connection 16 or 16' for the recipient client 10 or 10'. Thus, the routing function 42 incorporated into the SSL proxy server 40 provides secure information, including client identification, to and from the transaction server 50 without burdening the transaction server 50 with establishing an SSL connection for each client.

Furthermore, while FIG. 4 illustrates a single SSL proxy server 40 communicating with the transaction server 50, as will be appreciated by those of skill in the art, multiple SSL proxy servers according to the present invention may be provided. Thus, the present invention provides for scalability of the transaction server to additional clients by the inclusion of additional SSL proxy servers. Furthermore, while a single SSL connection is illustrated in FIG. 4 between the transaction server 50 and the SSL proxy server 40, as will be appreciated by those of skill in the art, additional persistent secure connections may be provided, for example, so as to increase the available bandwidth between the transaction server 50 and the SSL proxy server 40. Furthermore, a single SSL proxy server 40 may have persistent secure connections to more than one transaction server 50. In such a case the routing function would also determine the destination of a communication from a client and route the communication to the corresponding persistent secure connection.

Figure 5:
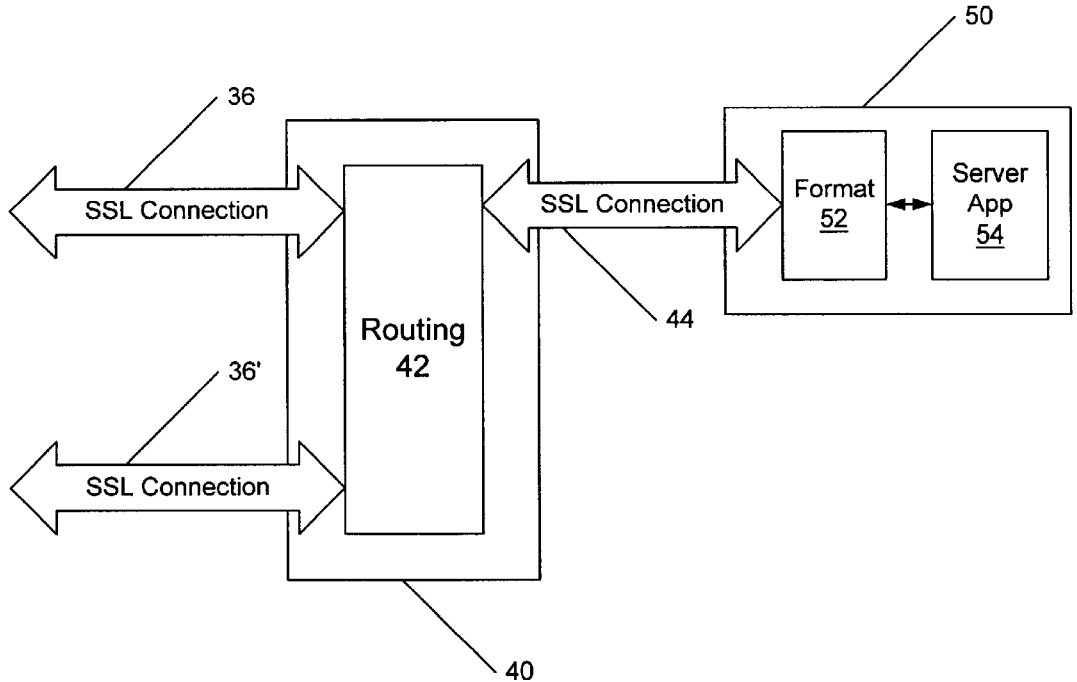
FIG. 5 is a more detailed diagram of communications between a client and a server utilizing an SSL proxy server according to an embodiment of the present invention.

FIG. 5 illustrates a particular embodiment of the present invention where client identification information is included in communications to the transaction server 50 as part of an SSL communication between the SSL proxy server 40 and the transaction server 50. As seen in FIG. 5, the transaction server 50 includes a format function 52 and a server application 54. The server application 54 may be a conventional server application.

As with the routing function 42, the format function may take the form of a module or other programming component stored in a processing system memory or storage device, may be a hardware function or may be a combination of hardware and software.

As briefly described above, the routing function 42 receives SSL communications from a client specific SSL connection 36, 36' to a client 10, 10' and forwards these communications over a persistent secure connection 44 to a transaction server 50. In the system illustrated in FIG. 5, this forwarding function may take the form of encapsulating SSL communications received over the client specific SSL connections 36, 36' as SSL communications transmitted over persistent SSL connection 44 to transaction server 50. Thus, the routing function 42 embeds the message content and the client identification information of a received communication from a client in an SSL communication transmitted over persistent SSL connection 44. The client identification information, may, for example, be embedded as a header in an SSL message to the transaction server 50.

The format function 52 receives communications transmitted over the persistent SSL connection 44 and extracts from the communications client identification information embedded in the communications. The format function 52 then provides the information content contained in the communication and the extracted client identification information to the server application 54. This information may be provided in the same manner as if the server application 54 were communicating with a client 10, 10' directly over a client specific SSL connection 36, 36' so that the inclusion of the SSL proxy server 40 according to the present invention may be transparent to the server application 54. Because the client identification information of the transaction server 50 is provided to the SSL proxy server 40 when the transaction server 50 communicates to a client, communications between the transaction server 50 and the client through the SSL proxy server 40 may be carried out in a conventional manner. Where an SSL proxy server is utilized, however, it may be necessary to route or demultiplex messages received from the transaction server 50 to the client specific SSL connection 36, 36' corresponding to the destination client. Thus, the present invention may provide transparent SSL communications between clients and a transaction server without burdening the transaction server with establishing SSL connections for each client.

Figure 6:
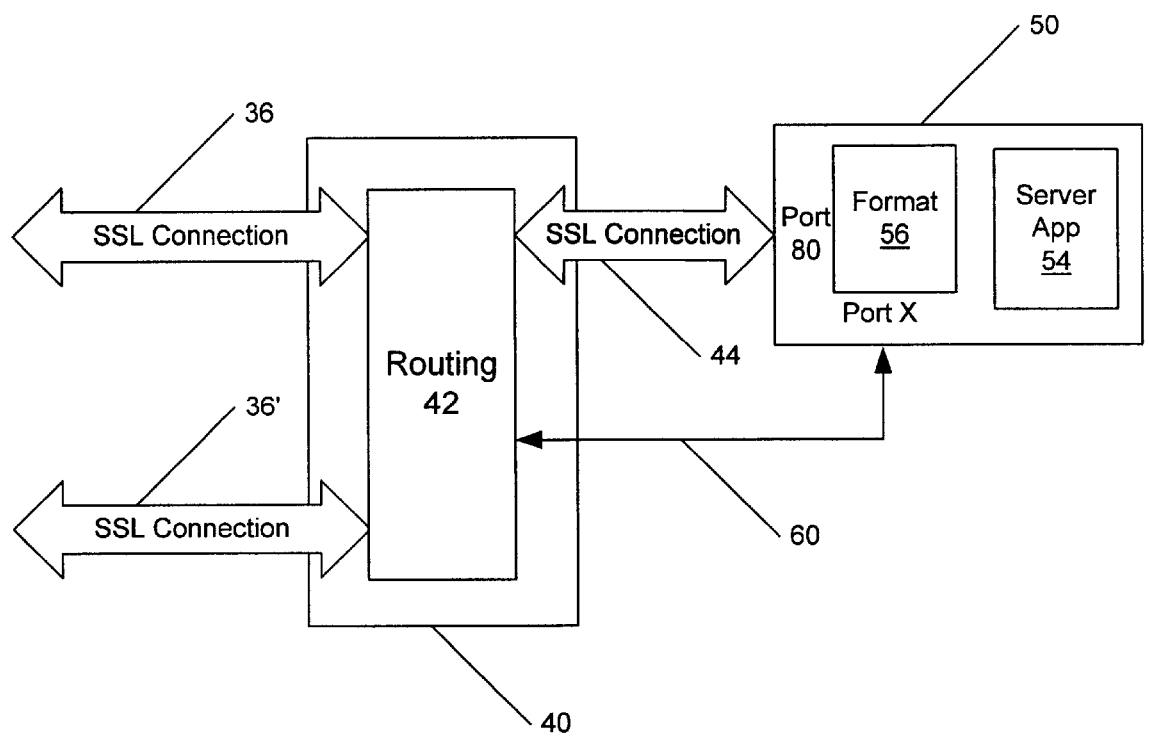
FIG. 6 is a more detailed diagram of communications between a client and a server utilizing an SSL proxy server according to a second embodiment of the present invention.

FIG. 6 illustrates an alternative embodiment of the present invention where a second connection 60 is established between the transaction server 50 and the SSL proxy server 40. As illustrated in FIG. 6, the second connection may be made to a port "X" which is a port other than the port where the SSL connection is made (e.g. other than port 443 for HTTPS connections). The routing function 42, then forwards over the persistent SSL connection 44 the information content of messages received from clients over the client specific SSL connection 36, 36' and provides the corresponding client identification information over the second connection 60 to port X.

The format function 56, receives the SSL communication over the persistent SSL connection 44 and the client identification information over the second connection 60 and matches the client identification information with the information content of the SSL communication so as to provide the information content and the client identification information to the server application 54. When the transaction server 50 communicates a message to a client 10, 10', the message is routed through the SSL proxy server 40 in a conventional manner. Where an SSL proxy server is utilized, however, it may be necessary to route or demultiplex messages received from the transaction server 50 to the client specific SSL connection 36, 36', corresponding to the destination client.

The present invention will now be described with reference to FIGS. 7 through 10 which are flowchart illustrations of operations according to embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

Figure 7:
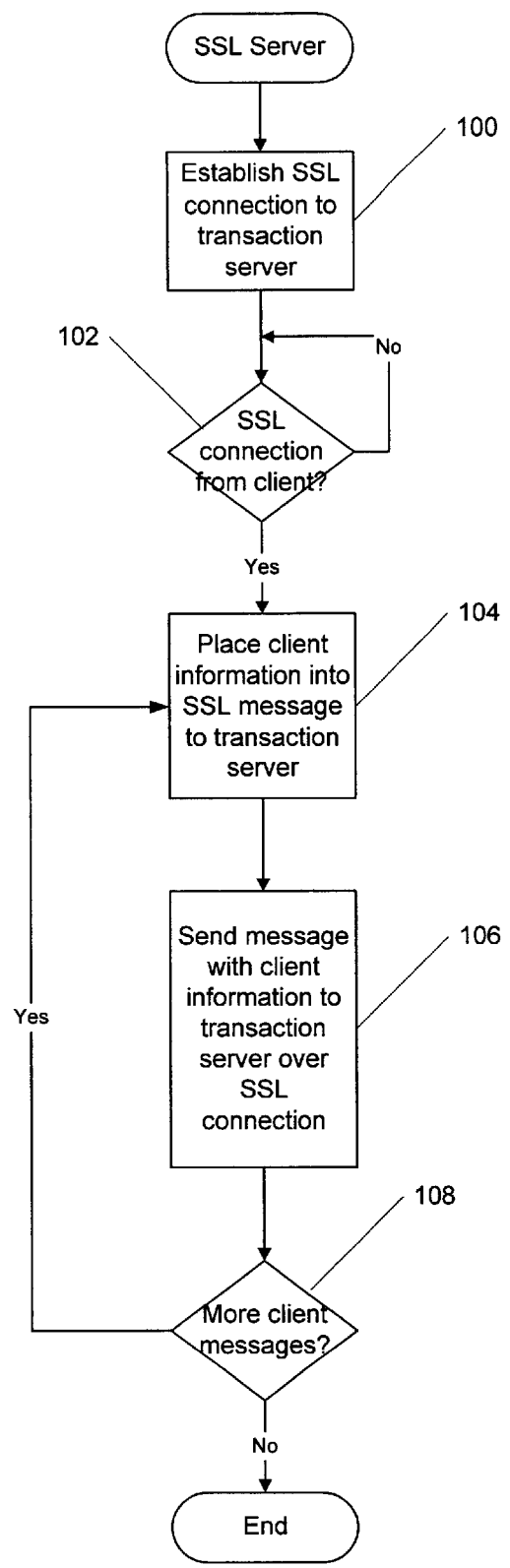
FIG. 7 is a flowchart illustrating operations of an SSL proxy server according to an embodiment of the present invention.

FIG. 7 illustrates operations of an SSL proxy server 40 according to the present invention as illustrated in the embodiment of FIG. 5 for forwarding messages from a client 10 or 10' to a transaction server 50. As seen in FIG. 7, the SSL proxy server 40 establishes a persistent secure connection such as an SSL connection 44 between the SSL proxy server 40 and the transaction server 50 (block 100). After the connection to the transaction server 50 is established, the SSL proxy server 40 waits for an SSL connection 36, 36' to be established with a client (block 102).

After an SSL connection is established, the client information of a message received over the client specific SSL connection 16 or 16' with the client is extracted from the message and placed in an SSL message to be sent over the persistent SSL connection 44 to the transaction server 50 (block 104). For example, the client identification information may be placed in a header in the SSL message to be sent to the transaction server 50.

The information content of the SSL message received from the client is also incorporated into the SSL message to be sent to the transaction server 50. The constructed SSL message to the transaction server 50 is then sent over the persistent SSL connection 44 to the transaction server 50 (block 106). If more messages are received (block 108), then the process is repeated until all of the messages have been forwarded to the transaction server 50.

Figure 8:
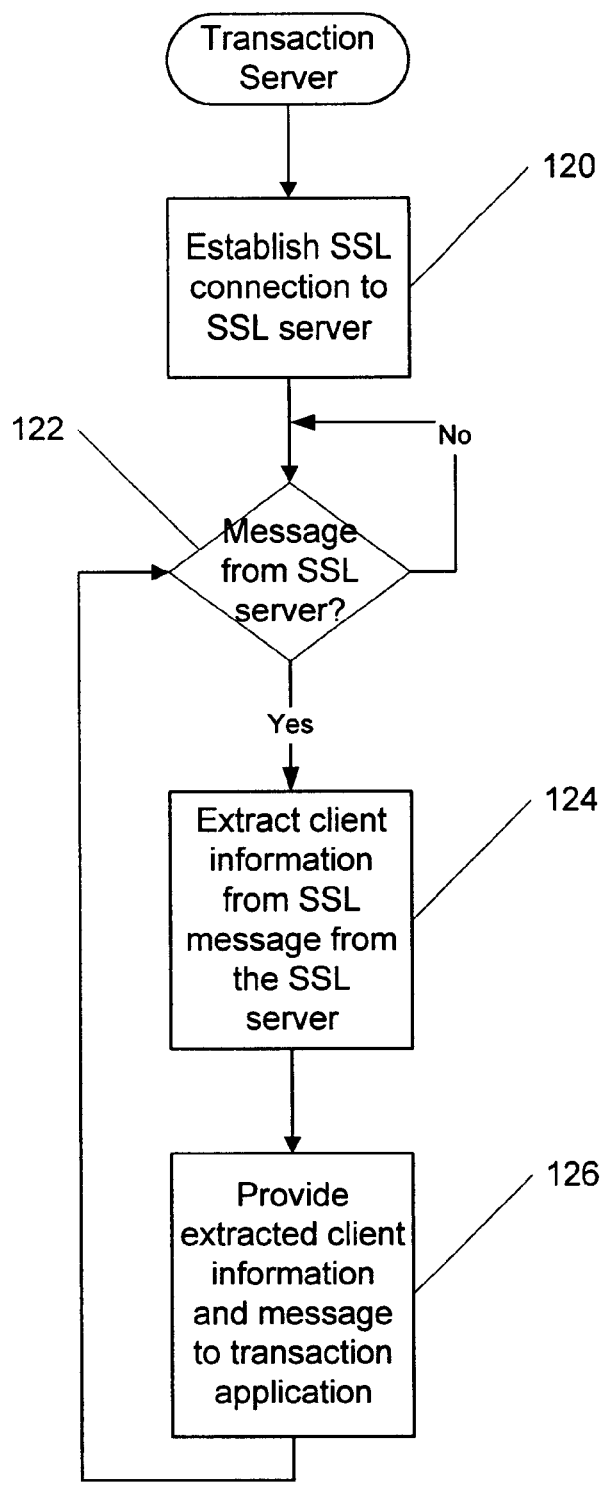
FIG. 8 is a flowchart illustrating operations of a transaction server according to an embodiment of the present invention.

FIG. 8 illustrates operations of the transaction server 50 according to the embodiment of the present invention illustrated in FIG. 5. As seen in FIG. 8, because the establishment of an SSL communication is a handshaking procedure, the transaction server 50 also begins by establishing the persistent SSL connection 44 between the transaction server 50 and the SSL proxy server 40 (block 120). After the persistent SSL connection 44 has been established, the transaction server 50 waits for messages over the persistent SSL connection 44 (block 122). When a message is received, the client information is extracted from the message (block 124) and the extracted client information and the information content of the message are provided to the transaction server application 54 (block 126).

Figure 9:
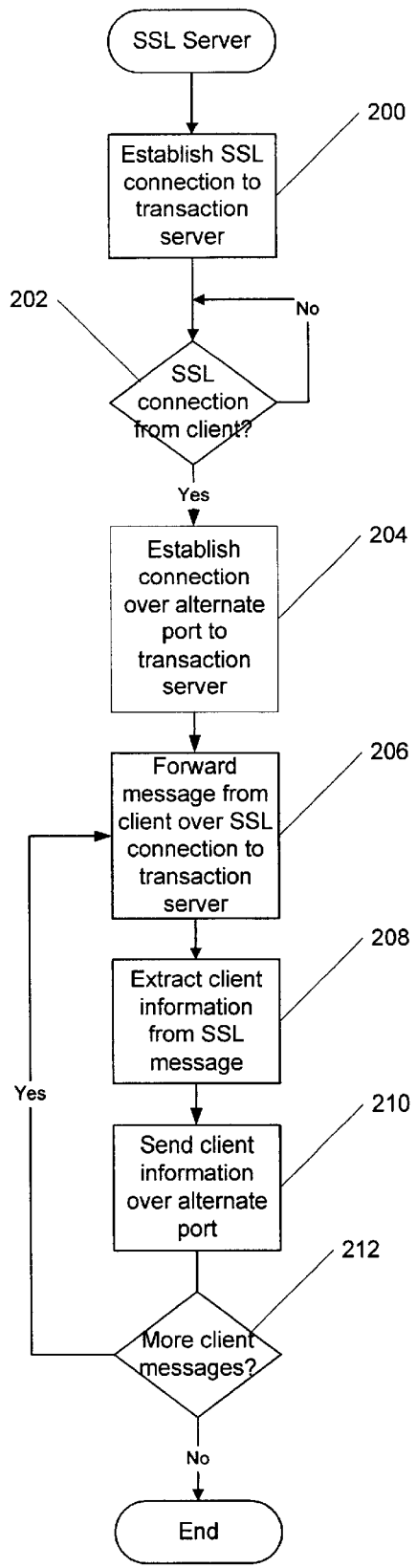
FIG. 9 is a flowchart illustrating operations of an SSL proxy server according to a second embodiment of the present invention.

FIG. 9 illustrates operations of an SSL proxy server 40 according to the present invention as illustrated in the embodiment of FIG. 6 for forwarding messages from a client 10 or 10' to a transaction server 50. As seen in FIG. 9, the SSL proxy server 40 establishes an persistent secure connection such as an SSL connection 44 between the SSL proxy server 40 and the transaction server 50 (block 200). After the connection to the transaction server 50 is established, the SSL proxy server 40 waits for a client specific SSL connection 36, 36' to be established with a client (block 202). After a connection is established, a second connection 60 to the transaction server 50 is established through the alternate port X (block 204). The second connection 60 may be established for each SSL connection to the SSL proxy server 40 or, alternatively, the second connection 60 could be established as a persistent connection prior or subsequent to connection by a client, and then utilized for multiple client SSL connections. Thus, the sequence of when the second connection 60 is established may depend on whether the second connection 60 is a persistent connection which may be utilized by more than one SSL connection.

In any event, the information content of the message received over the client specific SSL connection from the client may then be forwarded over the persistent SSL connection 44 to the transaction server 50 (block 206). Optionally, a message identifier may be incorporated into the SSL message sent to the transaction server 50. The client information of a message received over the client specific SSL connection 36 or 36' is also extracted from the message and placed in a message to be sent over the second connection 60 to the transaction server 50 (block 208). Furthermore, a message identifier corresponding to the persistent SSL message sent over the SSL connection 44 may also be incorporated into the message to be sent over the second connection 60.

The constructed message for transmission over the second connection 60 to the transaction server 50 is then sent over the second connection 60 to the transaction server 50 alternate port (block 210). If more messages are received (block 212), then the process is repeated from block 206 until all of the messages have been forwarded to the transaction server 50. Optionally, if the second connection is not a persistent connection or is associated with a specific SSL connection to a client from the SSL proxy server, then the second connection may be disconnected when the last message is sent.

Figure 10:
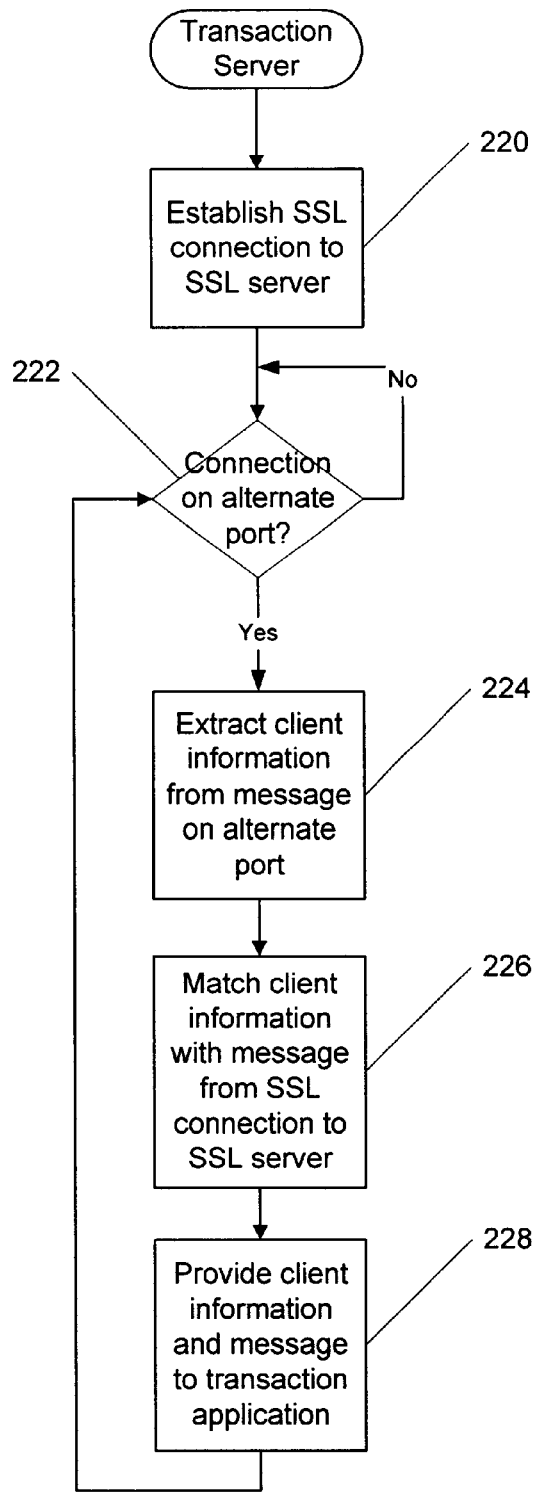
FIG. 10 is a flowchart illustrating operations of a transaction server according to a second embodiment of the present invention.

FIG. 10 illustrates operations of the transaction server 50 according to the embodiment of the present invention illustrated in FIG. 6. As seen in FIG. 10, the transaction server 50 also begins by establishing the persistent SSL connection 44 between the transaction server 50 and the SSL proxy server 40 (block 220). After the SSL connection has been established, the transaction server 50 waits for a second connection 60 on the alternate port X (block 222).

When a connection is made, the transaction server 50 waits for a message over alternate port X and when a message is received the client information is extracted from the received message (block 224) and the extracted client identification information is matched with a corresponding message from the persistent SSL connection 44 (block 226). Such a match may be made by, for example, incorporating message identification information into the SSL message and the message transmitted over the second connection 60 such that, if the message identification information matches, then the message received over the second connection 60 is a match with the message received over the persistent SSL connection 44. The client identification information and the information content of the message are provided to the transaction server application 54 (block 228).

As will be appreciated by those of skill in the art, the client identification information may include the user's name, location, organization, organizational unit, e-mail information, privileges and any other information defined by the administrator who issues the client's digital ID (X.509 V1 and V3 certificate format). The client identification would not need to be limited to the contents of the digital certificate. The SSL proxy could also map the certificate to other security credentials such as a Kerberos Pass Ticket or Resource Access Control Facility (RACF) login id.

While the present invention has been described with respect to routing functions and format functions as separate modules or objects, as will be appreciated by those of skill in the art, such functions may be incorporated with other functions such as, for example, through incorporation into protocol stacks or application programs or such functions may be independent applications. For example, the routing function 42 may be provided in the application layer of a protocol as an application program which receives information from the SSL of a first protocol stack and retransmits the information to a second SSL connection over a second protocol stack. Similarly, the format function may be incorporated into a protocol stack between the Secure Socket Layer and the application layer of the protocol stack. Thus, while the present invention is described with respect to a particular division of functions or sequences of events, such divisions or sequences are merely illustrative of particular embodiments of the present invention and the present invention should not be construed as limited to such embodiments.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of communicating between client applications and a transaction server, comprising:

establishing a persistent secure connection between the transaction server and a Secure Socket Layer (SSL) proxy server;

establishing a first session specific SSL connection, different from the persistent secure connection, between a first client application and the SSL proxy server;

forwarding communications between the first client application and the SSL proxy server transmitted over the first session specific SSL connection to the transaction server over the persistent secure connection; and forwarding client identification information received by the SSL proxy server to the transaction server so as to maintain an association of the client identification information with the forwarded communications between the first client application and the SSL proxy server.

2. A method according to claim 1, further comprising the steps of:

establishing a second session specific SSL connection between a second client application and the SSL proxy server; and forwarding communications between the second client application and the SSL proxy server transmitted over the second session specific SSL connection to the transaction server over the persistent secure connection.

3. A method according to claim 1, wherein the step of forwarding client identification information comprises the step of providing first client identification information extracted from the communications in a message transmitted to the transaction server over the persistent secure connection.

4. A method according to claim 3, wherein the step of providing first client identification information comprises the steps of:

incorporating the first client identification information as a message header of the message; and transmitting the message with the message header to the transaction server over the persistent secure connection.

5. A method according to claim 4, further comprising the steps of:
- receiving the message transmitted over the persistent secure connection;
- extracting from the message the first client identification information and content information from the communications; and
- providing the first client identification information and the extracted content information to a transaction server.

6. A method according to claim 1, wherein the step of forwarding client identification information comprises the step of:
- establishing a second connection between the SSL proxy server and the transaction server;
- extracting first client identification information and content information from the communications;
- transmitting the first client identification information to the transaction server over the second connection; and
- transmitting the content information to the transaction server over the persistent secure connection.

7. A method according to claim 6, further comprising the steps of:
- receiving the content information transmitted over the persistent secure connection;
- receiving the first client identification information transmitted over the second connection; and
- providing the first client identification and the content information to a transaction server.

8. A method according to claim 1, wherein the persistent secure connection is an SSL connection.

9. A system for communicating with client applications, comprising:
- a transaction server;
- an SSL proxy server operable for establishing Secure Socket Layer (SSL) connections with the client applications and for providing client identification information to the transaction server;
- a persistent secure connection between the SSL proxy server and the transaction server over which communications received over the SSL connections with the client applications are multiplexed.

10. A system according to claim 9, wherein the persistent secure connection comprises an SSL connection between the SSL proxy server and the transaction server.

11. A system according to claim 9, wherein the SSL proxy server multiplexes communications from the client applications onto the persistent secure connection and de-multiplexes communications from the persistent secure connection onto the SSL connections with the client applications.

12. A system according to claim 9, further comprising a second connection between the SSL proxy server and the transaction server operable to provide client identification information associated with communications over the persistent secure connection to the transaction server.

13. A system according to claim 12, wherein the second connection comprises a persistent connection.

14. A system according to claim 13, wherein the transaction server further comprises means for matching client identification information received over the second connection with the associated communications received over the persistent secure connection to provide the client identification and the associated communications received over the persistent secure connection to a server application.

15. A system for communicating between client applications and a transaction server, comprising:
- means for establishing a persistent secure connection between the transaction server and a Secure Socket Layer (SSL) proxy server;
- means for establishing a first session specific SSL connection, different from the persistent secure connection, between a first client application and the SSL proxy server;
- means for forwarding communications between the first client application and the SSL proxy server transmitted over the first session specific SSL connection to the transaction server over the persistent secure connection; and
- means for forwarding client identification information received by the SSL proxy server to the transaction server so as to maintain an association of the client identification information with the forwarded communications between the first client application and the SSL proxy server.

16. A system according to claim 15, further comprising:
- means for establishing a second session specific SSL connection between a second client application and the SSL proxy server; and
- means for forwarding communications between the second client application and the SSL proxy server transmitted over the second session specific SSL connection to the transaction server over the persistent secure connection.

17. A system according to claim 15, wherein the means for forwarding client identification information comprises means for providing first client identification information extracted from the communications in a message transmitted to the transaction server over the persistent secure connection.

18. A system according to claim 17, wherein the means for providing first client identification information comprises:
- means for incorporating the first client identification information as a message header of the message; and
- means for transmitting the message with the message header to the transaction server over the persistent secure connection.

19. A system according to claim 18, further comprising:
- means for receiving the message transmitted over the persistent secure connection;
- means for extracting from the message the first client identification information and content information from the communications; and
- means for providing the first client identification information and the extracted content information to a transaction server.

20. A system according to claim 15, wherein the means for forwarding client identification information comprises:
- means for establishing a second connection between the SSL proxy server and the transaction server;
- means for extracting first client identification information and content information from the communications;
- means for transmitting the first client identification information to the transaction server over the second connection; and
- means for transmitting the content information to the transaction server over the persistent secure connection.

21. A system according to claim 20, further comprising:
- means for receiving the content information transmitted over the persistent secure connection;

means for receiving the first client identification information transmitted over the second connection; and means for providing the first client identification and the content information to a transaction server.

22. A system according to claim 15, wherein the persistent secure connection is an SSL connection.

23. A computer program product for communicating between client applications and a transaction server, comprising:

a computer readable storage medium having computer readable program code embodied in said medium, said computer readable program code comprising:

computer readable program code for establishing a persistent secure connection between the transaction server and a Secure Socket Layer (SSL) proxy server;

computer readable program code for establishing a first session specific SSL connection, different from the persistent secure connection, between a first client application and the SSL proxy server;

computer readable program code for forwarding communications between the first client application and the SSL proxy server transmitted over the first session specific SSL connection to the transaction server over the persistent secure connection; and computer readable program code for forwarding client identification information received by the SSL proxy server to the transaction server so as to maintain an association of the client identification information with the forwarded communications between the first client application and the SSL proxy server.

24. A computer program product according to claim 23, further comprising:

computer readable program code for establishing a second session specific SSL connection between a second client application and the SSL proxy server; and computer readable program code for forwarding communications between the second client application and the SSL proxy server transmitted over the second session specific SSL connection to the transaction server over the persistent secure connection.

25. A computer program product according to claim 23, wherein the computer readable program code for forwarding client identification information comprises computer readable program code for providing first client identification information extracted from the communications in a message transmitted to the transaction server over the persistent secure connection.

26. A computer program product according to claim 25, wherein the computer readable program code for providing first client identification information comprises:

computer readable program code for incorporating the first client identification information as a message header of the message; and computer readable program code for transmitting the message with the message header to the transaction server over the persistent secure connection.

27. A computer program product according to claim 26, further comprising:

computer readable program code for receiving the message transmitted over the persistent secure connection;

computer readable program code for extracting from the message the first client identification information and content information from the communications; and computer readable program code for providing the first client identification information and the extracted content information to a transaction server.

28. A computer program product according to claim 23, wherein the computer readable program code for forwarding client identification information comprises:

computer readable program code for establishing a second connection between the SSL proxy server and the transaction server;

computer readable program code for extracting first client identification information and content information from the communications;

computer readable program code for transmitting the first client identification information to the transaction server over the second connection; and computer readable program code for transmitting the content information to the transaction server over the persistent secure connection.

29. A computer program product according to claim 23, further comprising:

computer readable program code for receiving the content information transmitted over the persistent secure connection;

computer readable program code for receiving the first client identification information transmitted over the second connection; and computer readable program code for providing the first client identification and the content information to a transaction server.

30. A computer program product according to claim 23, wherein the persistent secure connection is an SSL connection.

* * * * *